' US008316363B2

(12) United States Patent
Hocker et al.

(10) Patent No.: US 8,316,363 B2
(45) Date of Patent: Nov. 20, 2012

(54) CONCURRENT EMBEDDED APPLICATION UPDATE

(75) Inventors: Michael D. Hocker, Staatsburg, NY (US); Mark D. Marik, Denver, NC (US); Jimmie R. Mayfield, Jr., Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/822,799

(22) Filed: Jun. 24, 2010

(65) Prior Publication Data

US 2011/0321023 A1 Dec. 29, 2011

(51) Int. Cl.
*G06F 9/44* (2006.01)

(52) U.S. Cl. ........ 717/168; 717/170; 717/172; 717/173; 709/221

(58) Field of Classification Search .................. 717/168, 717/170, 172, 173; 358/1.15; 709/231, 221; 713/2; 726/1
See application file for complete search history.

(56) References Cited

U.S. PATENT DOCUMENTS

| | | | |
|---|---|---|---|
| 6,675,258 B1 | 1/2004 | Bramhall et al. | |
| 7,219,343 B2 | 5/2007 | Almeida et al. | |
| 7,457,945 B2 | 11/2008 | Dailey et al. | |
| 2003/0217171 A1* | 11/2003 | Von Stuermer et al. | 709/231 |
| 2004/0015940 A1* | 1/2004 | Heisey et al. | 717/168 |
| 2005/0160257 A1 | 7/2005 | Kruger et al. | |
| 2006/0143600 A1 | 6/2006 | Cottrell et al. | |
| 2008/0263350 A1* | 10/2008 | Haverkamp et al. | 713/2 |
| 2009/0080013 A1* | 3/2009 | Sato et al. | 358/1.15 |
| 2010/0293591 A1* | 11/2010 | Shah | 726/1 |
| 2010/0333081 A1* | 12/2010 | Etchegoyen | 717/172 |
| 2011/0289493 A1* | 11/2011 | Keefe et al. | 717/168 |

* cited by examiner

*Primary Examiner* — Le H Luu
(74) *Attorney, Agent, or Firm* — Cantor Colburn LLP; William A. Kinnaman, Jr.

(57) ABSTRACT

Providing concurrent embedded application updates comprising a first computer processor for executing a first embedded application, the executing generating a first plurality of processing threads, the first computer processor coupled to a first storage location and a second storage location. The first computer processor configured to accept and process instructions from a host system, receive one or more notifications indicating that a second embedded application has been successfully loaded into one of the first storage location and the second storage location, terminate execution of the first plurality of processing threads in response to receiving the one or more notifications, and execute the second embedded application while continuing to accept instructions from the host system and without restarting in response to receiving the one or more notifications.

25 Claims, 7 Drawing Sheets

CONCURRENT EMBEDDED APPLICATION UPDATE

BACKGROUND

This invention relates generally to processing within a computing environment, and more particularly to updating embedded applications concurrently without requiring a delay between shutting down the prior application and starting the updated version.

Advanced hardware devices typically contain embedded computer processors, memory, and other computing components. These devices execute instructions as software stored in embedded flash memory, for example. Through the development and debugging process the software stored in the embedded flash memory is enhanced with additional features and/or bug fixes. When a new version of the software is available, upgrading devices that are already deployed to production environments to the latest version is often desired. Typically, upgrading the embedded flash memory of the device necessitates stopping the currently running software instructions, copying the new software to the device's flash, and then restarting the execution of the software instructions. This process leaves the device unavailable to process requests while the device is being upgraded.

BRIEF SUMMARY

Additional embodiments include an apparatus for implementing concurrent embedded application updates, the apparatus comprising a first computer processor for executing a first embedded application, the executing generating a first plurality of processing threads, the first computer processor coupled to a first storage location and a second storage location. The apparatus further comprising the first computer processor configured to accept and process instructions from a host system, receive one or more notifications indicating that a second embedded application has been successfully loaded into one of the first storage location and the second storage location, terminate execution of the first plurality of processing threads in response to receiving the one or more notifications, and execute the second embedded application while continuing to accept instructions from the host system and without restarting in response to receiving the one or more notifications.

Additional embodiments include methods for implementing concurrent embedded application updates comprising executing a first embedded application, via a first computer processor, the executing generating a first plurality of processing threads, the first computer processor coupled to a first storage location and a second storage location, accepting and processing instructions from a host system at the first computer processor, receiving one or more notifications indicating that a second embedded application has been successfully loaded into one of the first storage location and the second storage location, terminating execution of the first plurality of processing threads in response to receiving the one or more notifications, and executing the second embedded application while continuing to accept instructions from the host system and without restarting in response to receiving the one or more notifications.

Further embodiments include an apparatus for implementing concurrent embedded application updates comprising a hardware device configured to receive requests from a host system, the hardware device comprising a first computer processor operatively coupled to a first storage device, a second storage device. The apparatus further comprising the first computer processor for executing a first embedded application, the executing generating a first plurality of processing threads, the first computer processor configured to accept and process instructions from the host system, receive one or more notifications indicating that a second embedded application has been successfully loaded into one of the first storage device and the second storage device, terminate execution of the first plurality of processing threads in response to receiving the one or more notifications, and execute the second embedded application while continuing to accept instructions from the host system and without restarting in response to receiving the one or more notifications.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Modern computer systems and hardware devices include dedicated computer processors and embedded applications embedded within the devices. The devices' computer processors execute the embedded applications in order to provide functions such as, for example, processing requests. The embedded applications allow for more complex functions and provide the ability to modify the functions of the device after it has been manufactured. The embedded application may be updated through several means such as wirelessly or via input/output (I/O) connections, however, the update process typically requires the device to be restarted, or to stop operating for a period of time during the upgrade process. For devices in a high availability environment, or where device downtime is problematic, updating the embedded application is prohibitively difficult. Concurrent Embedded Application Update (CEAU) provides mechanisms for updating an embedded application seamlessly in such a way that zero delay occurs between the termination of the old embedded application and beginning of execution of a newer version of the same embedded application. The advantage of CEAU is that there is neither a need to stop a host application from communicating to the embedded application while the new embedded application update is in progress, nor a need to reboot the embedded system after the new embedded application has been downloaded into the embedded system. Because there is no downtime or delay associated with CEAU, embedded application updates can occur at any time even in high availability environments.

Figure 1:
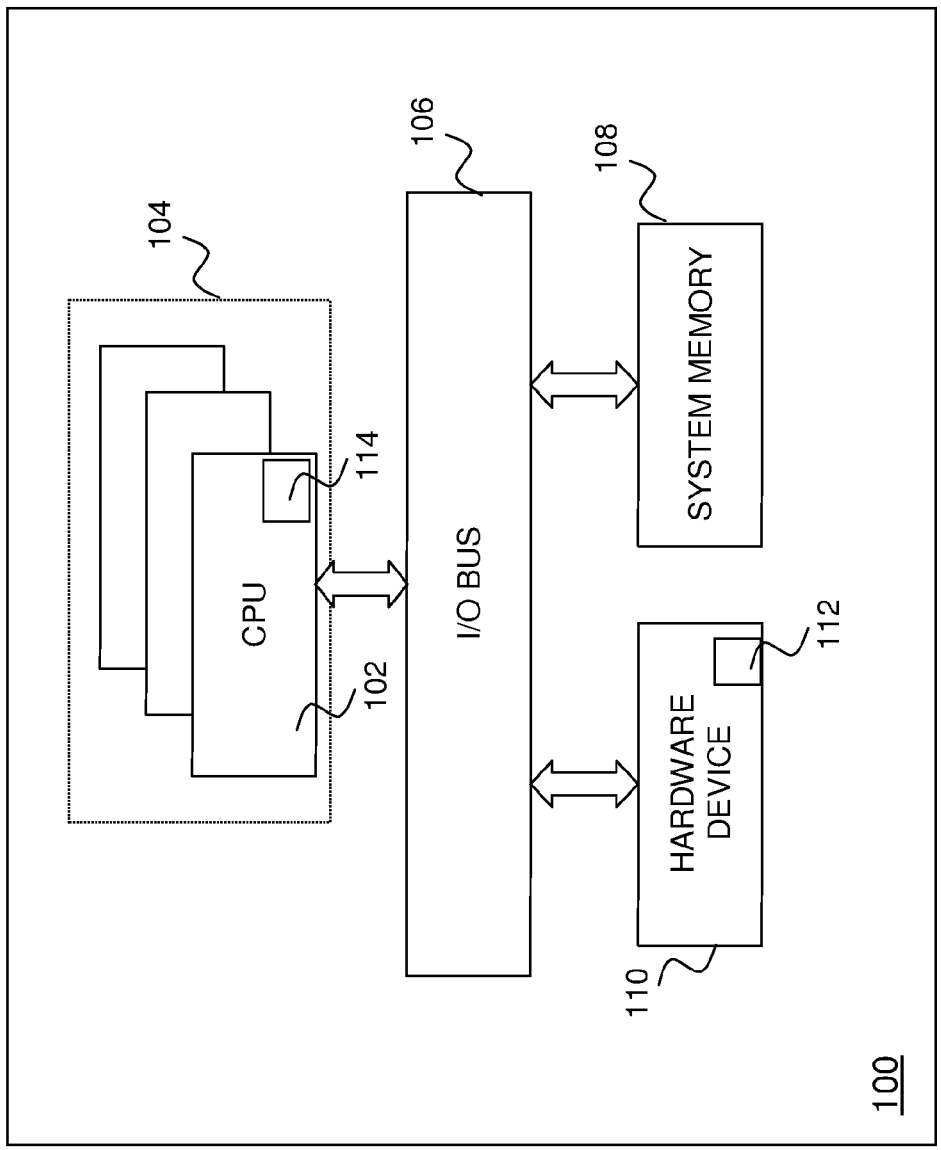
FIG. 1 depicts an example of a system on which embodiments of the present invention may be implemented.

FIG. 1 depicts an example of a host system 100 according to one embodiment. In an exemplary embodiment the host system 100 includes a cluster 104 of computer processor units (CPUs) 102. Of course, in additional embodiments the host system 100 may include only a single CPU 102. The invention is described as operation on a single CPU 102, however, it will be understood that a cluster 104 of CPUs may also be utilized and exemplary embodiments are not meant to be limited to a particular number of CPUs. The CPU 102 executes instructions for managing operation of the various components of the host system 100 and for executing other software and applications as is known in the art. The CPU 102 is operatively coupled to an I/O bus 106 for transmitting and receiving data from the system memory 108 and other devices such as hardware device 110. The system memory 108 stores data that is stored and accessed by the CPU 102 and other devices as is known in the art. The system memory 108 is operatively coupled to the I/O bus 106 and receives instructions over the I/O bus 106 for storing and accessing data. The I/O bus 106 facilitates high-speed communications between the CPU 102, the system memory 108 and one or more hardware devices.

The hardware device 110 is operatively coupled to the I/O bus 106 and may provide access to external data, or other services (e.g. hardware accelerated data encryption and signing). The hardware device 110 may be the only device coupled to the I/O bus 106, or may be one of several devices each providing services to the host system 100, the CPU 102, or any other devices in the host system 100 or over a network (not shown). Although in exemplary embodiments the hardware device 110 is connected to an I/O bus 106, it will be understood that the hardware device 110 may also a standalone hardware device 110 such as a handheld computer, cellular telephone or any other device that supports embedded applications. Exemplary embodiments are not meant to be limited to any particular hardware device configuration. The hardware device 110 includes support logic 112 for providing processing services to the hardware device 110 as will be described in more detail below.

Figure 2:
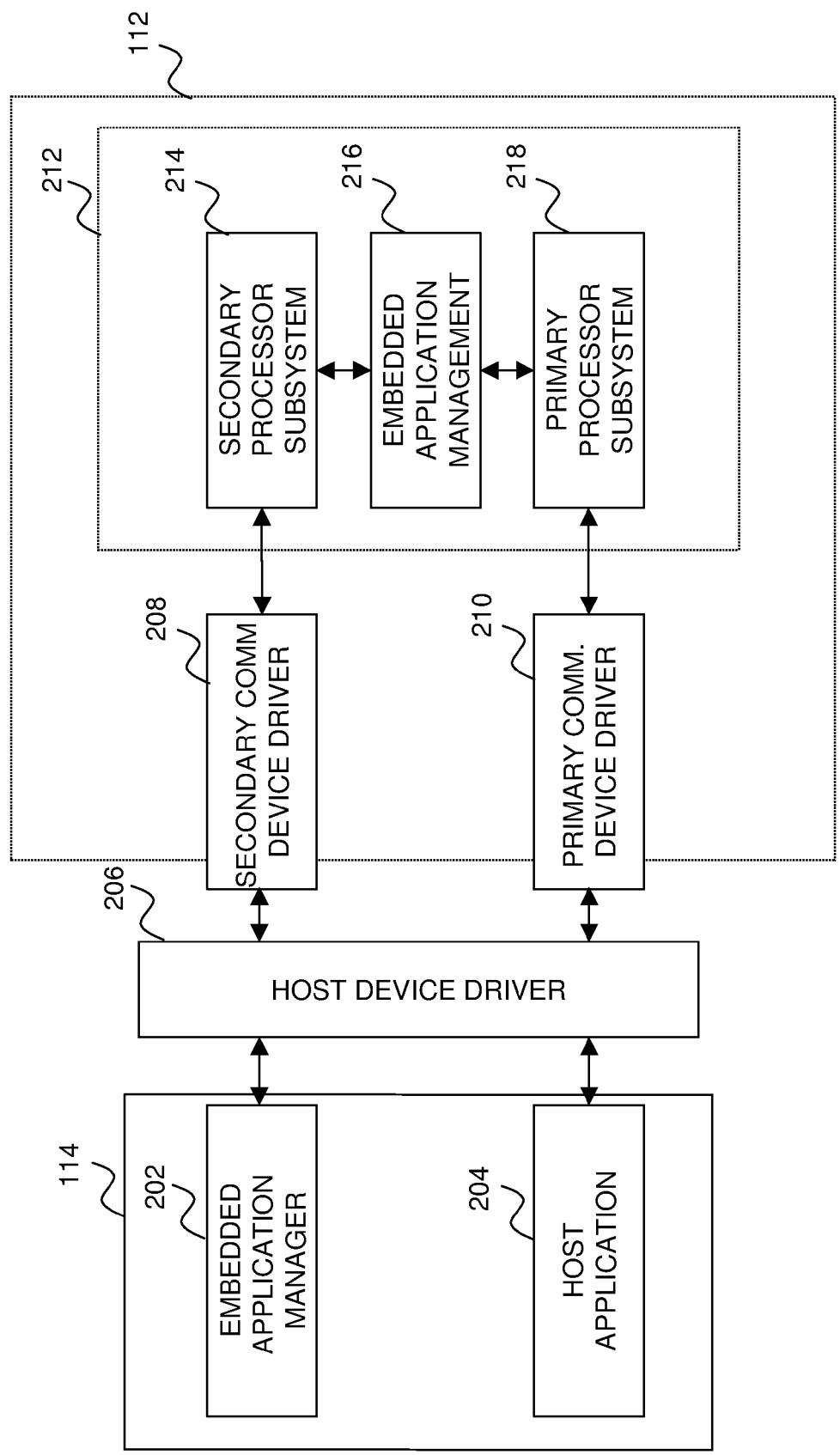
FIG. 2 depicts a detail example of support logic according to one embodiment.

FIG. 2 depicts a detailed example of the support logic 112 according to one embodiment. In an exemplary embodiment the support logic 112 executes on the hardware device 110. In an exemplary embodiment the support logic 112 is operatively coupled to an embedded application manager 202 for managing distribution and installation of new embedded applications. The support logic 112 is also operatively coupled to a host application 204. The host application 204 sends requests to the support logic 112 for access to services provided by the hardware device 110. The host application 204 and the embedded application manager 202 are executed by the host system 100 and are operatively coupled to a host device driver 206. The host device driver 206 supports communication from the host application 204 and the embedded application manager 202. The host device driver 206 is operatively coupled to the support logic 112 and is used to transmit requests to the support logic 112 from one ore more host system applications (e.g. the embedded application manager 202 and the host application 204). In an exemplary embodiment the host device driver 206 communicates with the support logic 112 via a peripheral component interconnect (PCI) or peripheral component interconnect express (PCIe) protocol. Of course, in alternate embodiments, the host device driver 206 may communicate with the hardware device 110 using any other protocol, including proprietary protocols as is understood by those of average skill in the art. In alternate embodiments, the host application 204 may communicate directly to the support logic 112 without using the host device driver 206. In one embodiment, the host application 204 may manage the distribution and installation of new embedded applications instead of, or in conjunction with, the embedded application manager 202.

The support logic 112 includes a primary communication device driver 210 which is operatively coupled to the host device driver 206, receives requests for system resources or functions, and transmits responses and statuses to the host system 100, the embedded application manager 202, and/or the host application 204 via the host device driver 206. The primary communication device driver 210 is operatively coupled to the primary processor subsystem 218 and forwards the requests from the host device driver 206 to the primary processor subsystem 218. The primary communication device driver 210 also transmits requests, and responses from the primary processor subsystem 218 from and to the host device driver 206. The support logic 112 includes a secondary communication device driver 208 which is operatively coupled to the host device driver 206, receives requests for system resources or functions, and transmits responses and statuses to the host system 100, the host application 204, and/or the embedded application manager 202 via the host device driver 206. The secondary communication device driver 208 is operatively coupled to the secondary processor subsystem 214 and forwards the requests from the embedded application manager 202 and/or the host application 204 to the secondary processor subsystem 214. The secondary communication device driver 208 may also transmit requests, and responses from the secondary processor subsystem 214 from and to the host device driver 206.

The embedded application processing subsystem 212 provides all of the support logic 112 processing services and includes the primary processor subsystem 218, the secondary processor subsystem 214 and the embedded application management logic 216. The primary processor subsystem 218 executes the embedded application, which provides services and support to the host system 100 as will be described in more detail below. The secondary processor subsystem 214 provides support, installation and management of the embedded applications. In one embodiment, the secondary processor subsystem 214 may also support security related operations, such as application verification, hardware verification, and send status commands to the host system 100 related to the embedded applications. The embedded application management logic 216 is operatively coupled to the secondary processor subsystem 214 and the primary processor subsystem 218 and manages the installation and initialization of new embedded applications as will be described in more detail below. For ease of explanation the embedded application processing subsystem 212 of the support logic 112 has been described as including a plurality of subsystems and logic, however it will be understood that all of the functions described herein may be executed in a single subsystem.

Figure 3:
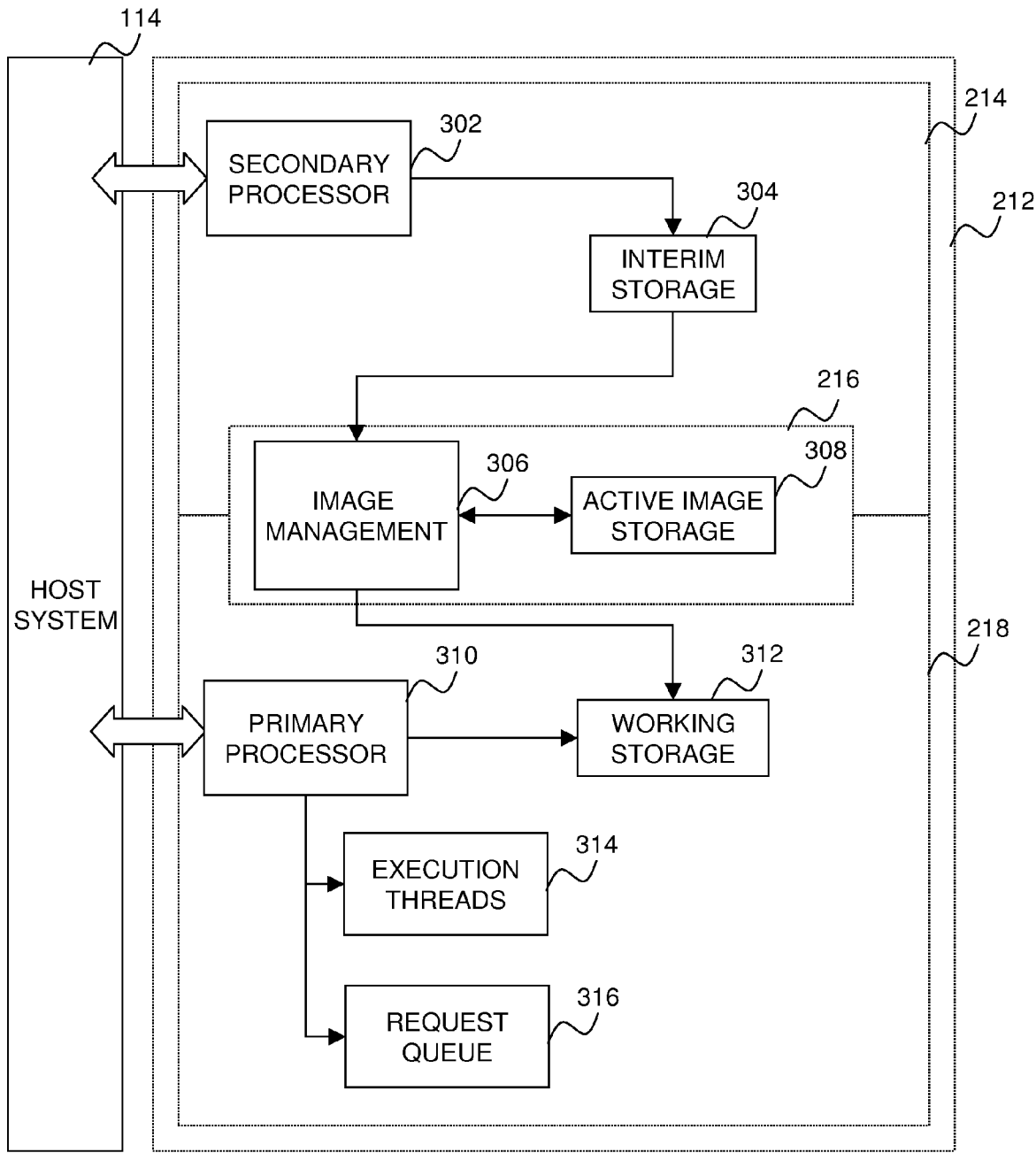
FIG. 3 depicts a detailed example of an embedded application processing subsystem according to one embodiment.

Turning now to FIG. 3 a detailed view of the embedded application processing subsystem 212 is described according to one embodiment. In an exemplary embodiment the embedded application processing subsystem 212 executes on the hardware device 110. The primary processor subsystem 218 includes a primary processor 310. In an exemplary embodiment the primary processor 310 is a PowerPC® 405. Of course in the primary processor 310 may be any processor capable of processing instructions as would be understood by those of ordinary skill in the art. The primary processor 310 executes an embedded application and provides services to the host system 100. The embedded application is stored in a working storage 312. In an exemplary embodiment, the working storage 312 may be volatile random access memory (RAM), of course any other storage device capable of storing data, such as, for example, a magnetic disc, or other such device may be used to store the embedded application. The primary processor 310 loads embedded application instructions from the working storage 312 and executes one or more execution threads 314. The execution threads 314 process requests from a request queue 316. The request queue 316 is operatively coupled to primary processor 310. The hardware device 110 requests from the host application 204 are placed in the request queue 316 until they are processed by the execution threads 314.

The secondary processor subsystem 214 includes a secondary processor 302 for managing the installation and distribution of embedded applications. The secondary processor 302 communicates with the host system 100 and receives new embedded applications and provides hardware and embedded application statuses to the host system 100. In an exemplary embodiment, the secondary processor 302 may be any processor capable of processing instructions (e.g. 32-bit soft Xilinx MicroBlaze processor.) Of course the secondary processor may be any other processor capable of processing instructions as is known in the art. The secondary processor 302 is operatively coupled to an interim storage 304. In an exemplary embodiment the interim storage 304 may be any storage device capable of storing data. Of course the interim storage 304 may be any storage as is known in the art. The secondary processor 302 stores new embedded applications in the interim storage 304 as will be described in more detail below.

The embedded application management logic 216 includes image management logic 306 which manages the installation of new embedded applications as will be described in more detail below. The image management logic 306 is operatively coupled to both the interim storage 304 and the active image storage 308. The image management logic 306 can access and map either the old or new "inactive" image stored in interim storage 304, to the active image storage 308. In an exemplary embodiment the active image storage 308 is a non-volatile memory which does not lose data upon loss of power. In an exemplary embodiment the active image storage 308 may be any storage device capable of storing data (e.g. a Spansion 512 Mbit Burst Mode simultaneous read/write 66 MHz Flash.). Of course the active image storage 308 may be any storage as is known in the art. The active image storage 308 stores the most current version of the embedded application as will be described in more detail below. The image management logic 306 is also operatively coupled to the working storage 312 and can copy the embedded application stored in the active image storage 308 to the working storage as will be described in more detail below.

Figure 4:
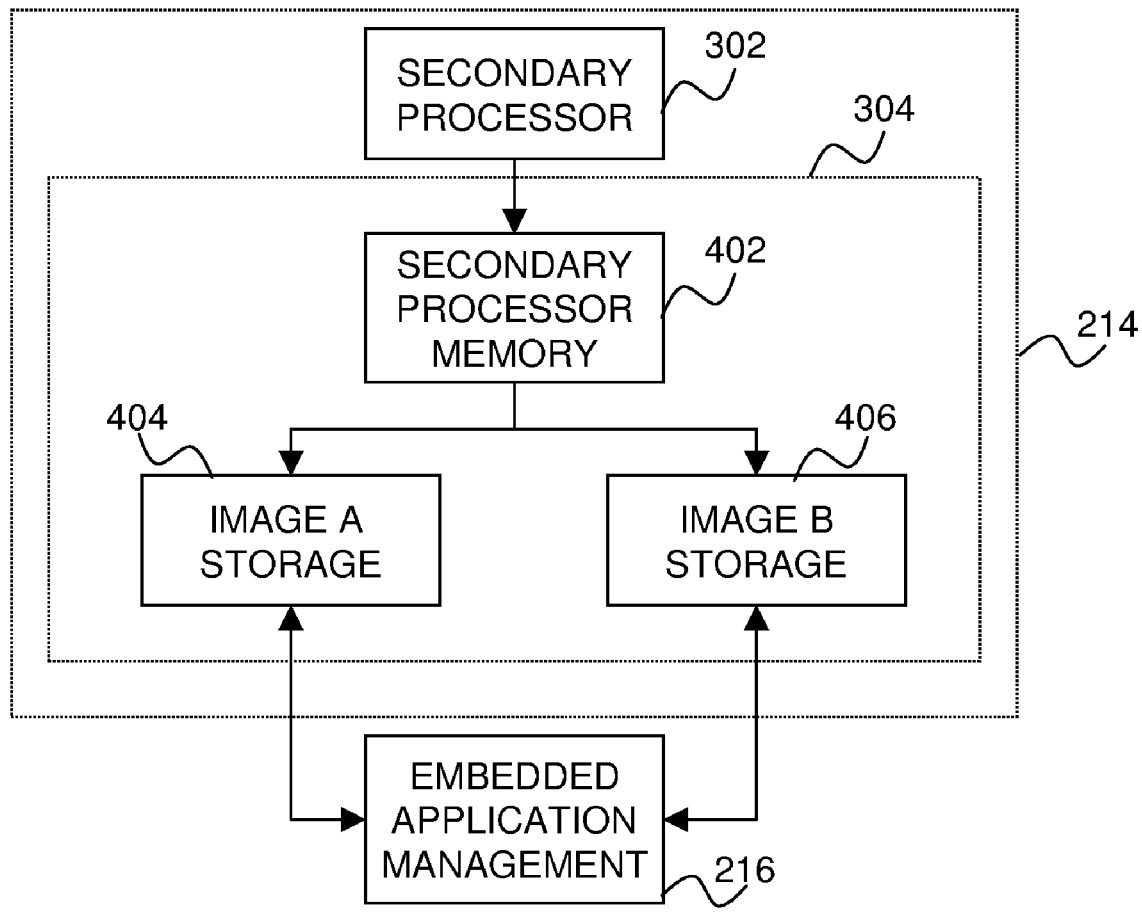
FIG. 4 depicts a detailed example of a secondary processor subsystem according to one embodiment.

Turning now to FIG. 4 a detailed view of the secondary processor subsystem 214 is described according to an embodiment. In an exemplary embodiment secondary processor subsystem 214 executes within the embedded application processing subsystem 212. The interim storage 304 of FIG. 3 includes secondary processor memory 402. In an exemplary embodiment the secondary processor memory 402 is may be any memory device capable of storing data (e.g. Samsung 512 Mbit 667 MHz DDR2). Of course the secondary processor memory 402 may be any storage as is known in the art. In an exemplary embodiment the secondary processor memory 402 is used to store embedded applications sent to the secondary processor 302 from the host system 100. In one embodiment, the secondary processor memory 402 may include data used by the secondary processor 302 for instruction execution. The secondary processor memory 402 is operatively coupled to an image A storage 404 and an image B storage 406. In an exemplary embodiment both the image A storage 404 and the image B storage 406 may be any storage device capable of storing data (e.g. a Spansion 512 Mbit Burst Mode simultaneous read/write 66 MHz Flash.). Of course the image A storage 404 and the image B storage 406 may be any storage as is known in the art. The image storage A 404 and image storage B 406 are each used to store embedded applications as will be described in more detail below. In an exemplary embodiment, the image storage A and image storage B are operatively coupled to the embedded application management logic 216. The embedded application management logic 216 transfers the embedded application from each of the image storage A 404 and image storage B 406 to working storage 312 as will be described in more detail below.

Figure 5:
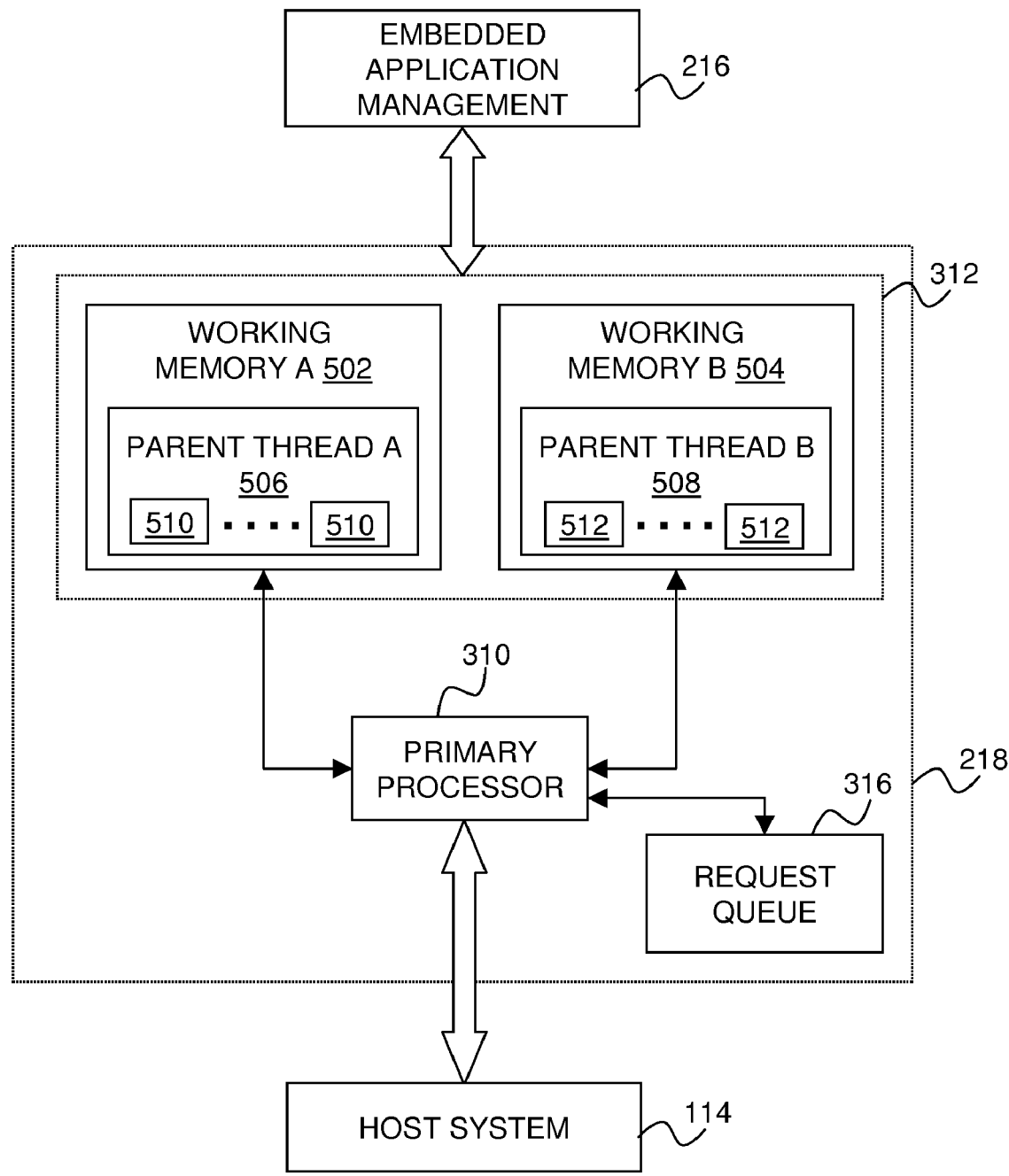
FIG. 5 depicts a detailed example of a primary processor subsystem according to an embodiment.

Turning now to FIG. 5 a detailed view of the primary processor subsystem 218 is described according to an embodiment. In an exemplary embodiment primary processor subsystem 218 executes within the embedded application processing subsystem 212. In an exemplary embodiment the working storage 312 of the primary processor subsystem 218 is logically divided into two memory segments working memory A 502 and working memory B 504. The working memory A 502 and working memory B 504 each store embedded applications which are executed by the primary processor 310. When the embedded application stored in working memory A 502 is executing, the primary processor 310 executes a parent thread A 506 in working memory A 502. In an exemplary embodiment the parent thread A 506 monitors and manages one or more working threads A 510. Of course the working threads A 510 may execute without a parent thread in additional embodiments. The primary processor 310 executes the working threads A 510. The working threads A 510 process requests from the host system 100 and return responses to the host system 100.

When the embedded application stored in working memory B 504 is executing, the primary processor 310 executes a parent thread B 508 in working memory B 504. In an exemplary embodiment the parent thread B 508 monitors and manages one or more working threads B 512. Of course the working threads B 512 may execute without a parent thread in additional embodiments. The primary processor 310 executes the working threads B 512. The working threads B 512 process requests from the host system 100 and return responses to the host system 100. In an exemplary embodiment the embedded application stored in working memory A 502 and the embedded application in working memory B 504 may execute simultaneously, however, in exemplary embodiments only one set of working threads 510 or 512 may process host requests at a time as will be described in more detail below.

Figure 6:
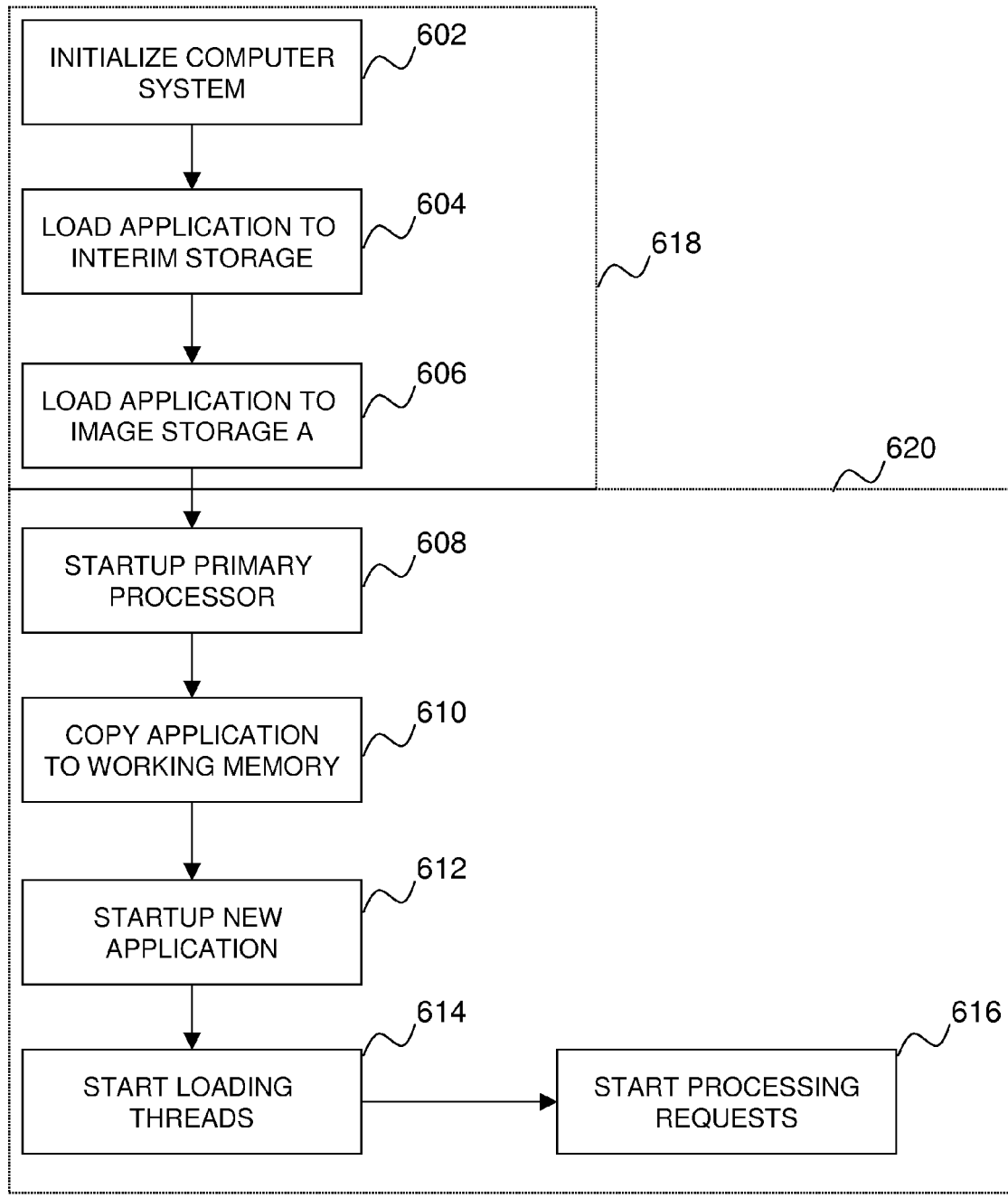
FIG. 6 block diagram of an exemplary embodiment of a hardware device initialization process flow according to an exemplary embodiment of the invention.

Turning now to FIG. 6 a block diagram of an exemplary embodiment of a hardware device 110 initialization process flow will be described. In an exemplary embodiment the hardware device 110 process flow executes within the embedded application processing subsystem 212. At block 602 the hardware device 110 is initialized (e.g. device installation). At block 604 the secondary processor 302 receives an embedded application from the host system 100 and loads it to interim storage 304. In exemplary embodiments the secondary processor 302 may load the embedded application into secondary processor memory 402 and may provide a verification service which verifies that the embedded application is valid. The secondary processor 302 may, but is not required to, verify the embedded application by either calculating a message authentication code (MAC) on the received downloaded image data as is known in the art and comparing the calculated MAC against a MAC contained in the downloaded image, or by means of performing a cryptographic hash upon the downloaded image and comparing the calculated hash to a hash value contained in the downloaded image as is known in the art. Once the secondary processor 302 determines that the embedded application should be installed, the secondary processor 302 copies the embedded application that was received into secondary processor memory 402 to image storage A 404 of FIG. 4. Image B storage 406 of FIG. 4 may also be the target of the copy operation as will be described in more detail below. At block 606 the image management logic 306 maps the embedded application from image A storage 404 of FIG. 4 to the active image storage 308.

Turning now to block 608 of FIG. 6 the host system 100 initializes the primary processor 310. At block 610 the primary processor 310 copies the embedded application to from the active image storage 308 to the working memory A 502. In one embodiment the primary processor 310 may copy the active image storage 308 to working memory A 502 by, for example, first mounting active image storage 308 with a filesystem mount command and thereafter accessing the embedded application by filesystem operations that use working memory A 502 like a folder system as is known in the art. At block 612 the primary processor 310 executes the embedded application in working memory A 502. At block 614 the primary processor 310 initializes the working threads 510 of FIG. 5. At block 616 the working threads 510 begin processing requests from the request queue 316 of FIG. 3 received by the host system 100. Once the hardware device 110 has been initialized as described above, the embedded application is stored in, and executed from, the working memory A 502 which serves as a backing store in lieu of active image storage 308. Active image storage 308 is now available to be remapped, in other words, upon the next embedded image download from 100, active image B storage 406 can be mapped to active image storage 308 while working memory A 502 remains unaffected by this underlying remapping. Upon subsequent embedded application downloads, the device hardware may execute the execution logic 620 (blocks 610-614) without executing the installation logic 618 (blocks 602-608). In addition, the primary processor 310 may determine if the embedded application is compatible with the hardware device 110. In an exemplary embodiment the primary processor 310 determines that the embedded application is valid by checking an Agent Identification (ID) value of the newly downloaded embedded application. If the Agent ID of the embedded application in working storage B 504 matches the Agent ID of the embedded application in working storage A 502, then the application in working storage B 504 is considered a valid update for the application currently executing threads out of working storage A 502, and vice versa. In other words, if the Agent ID of the embedded application in working storage A 502 matches the Agent ID of the embedded application in working storage B 504, then the application in working storage A 502 is considered a valid update for the application currently executing threads out of backing store memory B 504.

Figure 7:
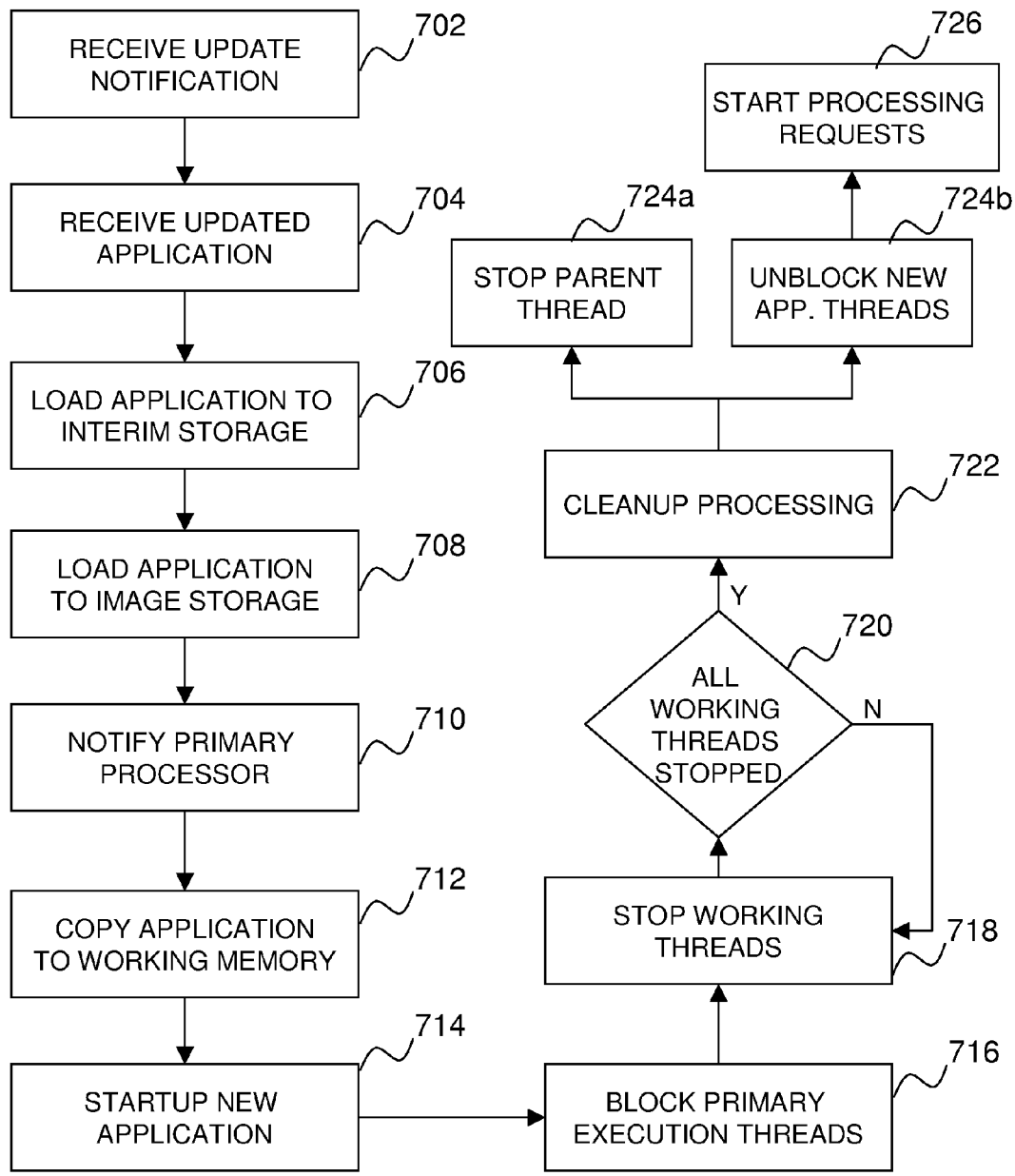
FIG. 7 depicts a block diagram of an embedded application update process flow according to an exemplary embodiment of the invention.

Turning now to FIG. 7 depicts a block diagram of an exemplary embodiment of an embedded application update process flow will be described. In an exemplary embodiment the embedded application update process flow is executed in the embedded application processing subsystem 212. At block 702 the secondary processor 302 of FIG. 3 receives an update notification from the host system 100 indicating that a new embedded application is to be installed on the hardware device 110. In an exemplary embodiment the embedded application manager 202 may initiate the update by issuing the update notification and sending it to the secondary processor 302. At block 704 the secondary processor 302 receives the updated embedded application from the host system 100. In an exemplary embodiment the embedded application manager 202 may transmit the new embedded application to the secondary processor 302.

At block 706, the secondary processor 302 loads the received embedded application into the secondary processor memory 402. At block 708 the secondary processor 302 loads the embedded application to one of the two image storage locations 404 and 406. In an exemplary embodiment the secondary processor 302 tracks which of image storage A 404 and image storage B 406 contain the currently executing embedded application. In one embodiment the secondary processor 302 may use a counter (e.g. a register) (not shown) and increments the counter each time a new embedded application is loaded. In one embodiment if the counter contains an even number the secondary processor 302 loads the new embedded application in image A storage 404. If, however, the counter contains an odd number then the secondary processor 302 loads the new embedded application in image storage B 406. Of course this embodiment is only one way of determining which of image storage A 404 or image storage B 406 should be used to store the new embedded application and exemplary is not meant to be limiting. Any other mechanism for tracking where to store the embedded application as could be used. Once the embedded application has been installed in one of the image storage locations 404 and 406, the image management logic 306 maps the new embedded application from the image storage 404 and 406 to the active image storage 308. While the new embedded application is being mapped to the active image storage 308 the primary processor 310 continues to process requests from the host system 100 without interruption.

Turning now to block 710 of FIG. 7, in an exemplary embodiment the host system 100 notifies the primary processor 310 that a new embedded application has been installed and loaded into one of the image storages 404 or 406. At block 712 the primary processor 310 mounts the active image storage 308 as a filesystem directory and copies the embedded application from the active image storage 308 to one of the working memories 502 and 504. In an exemplary embodiment the primary processor 310 copies the active image to whichever working memory (either A 502 or B 504) which does not currently have an executing embedded application. The working memory A 502 or B 504 is used as a backing store. For example, if the working memory A 502 is currently executing an embedded application, the primary processor 310 copies the active image storage 308 to the working memory B 504. Of course if working memory B 504 is currently executing an embedded application, the primary processor 310 will copy the active image storage 308 to the working memory A 502. For purposes of clarity the remainder of the process will be described with the currently executing application loaded in working memory A 502 and executing parent thread A 506 and working threads A 510 and the new embedded application will be loaded in working memory B 504. Of course the process flow would be the same if the embedded applications were loaded in the reverse. At block 714, the new embedded application is started in working memory B 504. In an exemplary embodiment when the new embedded application is started the parent thread B 508 and working threads B 512 are started but are not allowed to access the request queue 316. By blocking the working threads B 512 they are prevented from processing requests prematurely. In other embodiments, however, the working threads B 512 are allowed to process requests from the request queue 316 concurrently with the working threads A 510.

At block 716, in an exemplary embodiment, the working threads A 510 are blocked from accessing the request queue 316. At block 718 the working threads A 510 each finish processing their current request and are terminated. In exemplary embodiments the working threads A 510 may be terminate after attempting to process an additional request from the request queue 316. At block 720 the parent thread A 506 monitors the working threads 510 and determines if they have all terminated. If at least one working thread A 510 is still running the parent thread A 506 continues monitoring threads until all of the working threads A 510 have terminated. If, however, all of the working threads A 510 have terminated the parent thread A 506 begins the clean up process. In an exemplary embodiment the parent thread A 506 may, for example, close any open connections, and transmit status entries and termination notifications to the host system 100. Of course the parent thread A 506 may be configured to process additional cleanup instructions such as closing file handles of files that reside in battery backed RAM (BBRAM) (not shown). These BBRAM files persist across embedded application updates and represent one such resource that is "shared" across old and new embedded applications. The BBRAM files may, for example, contain embedded application state information indicating how far along in a meta-function, parent thread 506 reached. Then when a new application with parent threads 508 and working threads 512 are unblocked, these BBRAM files containing state information can be used to continue the meta-function where the old embedded application left off. In other embodiments the parent thread A 506 simply notifies the host system 100 that all working threads A 510 have terminated. Once the parent thread A 506 completes the cleanup process, if any, the parent thread A 506 is terminated at block 724*a*. At block 724*b* the working threads B 512 of the new embedded application are unblocked, and are allowed to access the request queue 316. In an exemplary embodiment blocks 724*a* and 724*b* are executed simultaneously. In other embodiments they are processed sequentially with the working threads B 512 being unblocked before the parent thread A 506 is terminated. In yet another embodiment, the parent thread A 506 is terminated before the working threads B 512 begin execution. At block 726 the working threads B 512 begin processing requests from the request queue 316. In an exemplary embodiment the primary processor 310 may notify the host system 100 that the update process has completed successfully.

In exemplary embodiments, the request queue 316 continues to receive requests from the host system 100 throughout the update process and, therefore, neither the host system 100 or the host application 204 experience downtime during the embedded application update.

In exemplary embodiments, the secondary processor 302 may fail to load the new embedded application successfully. This failure may be due to, for example, an incomplete delivery of the embedded application, the new embedded application is not compatible with the primary processor as determined by the verification service, and/or the new embedded application is not authorized to be executed in the hardware device 110. If the secondary processor fails to load the embedded application at block 708 for example, the primary processor continues to execute the original embedded application and processing requests from the host system 100 uninterrupted.

Certain embodiments of the invention have been described with specific combinations of hardware, such as for example, two computer processors, for purposes of clarity, such embodiments are not meant to be limiting. It will be understood that other combinations of hardware and software could be used to implement the support logic 112, such as for example, the use of a single processor and/or single storage device as is known in the art.

Although aspects of the present invention have been described as operating on various hardware and circuit components, it will be understood that the invention may be realized by software or a combination of software and the same or other hardware components as will be understood.

Technical effects and benefits include the ability to update an embedded application without the need to stop a host application from communicating with the embedded application while the new embedded application update is in progress, nor the need to reboot the embedded system after the new embedded application has been downloaded into the embedded system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for implementing concurrent embedded application updates comprising:
   a first computer processor for executing a first embedded application, the executing generating a first plurality of processing threads, the first computer processor coupled to a first storage location and a second storage location;
   the first computer processor configured to accept and process instructions from a host system, receive one or more notifications indicating that a second embedded application has been successfully loaded into one of the first storage location and the second storage location, terminate execution of the first plurality of processing threads in response to receiving the one or more notifications, and execute the second embedded application while continuing to accept instructions from the host system and without restarting in response to receiving the one or more notifications.

2. The apparatus of claim 1, wherein the first embedded application is stored in the first storage location, and the second embedded application is stored in the second storage location.

3. The apparatus of claim 2, wherein executing the second embedded application generates a second plurality of processing threads;
   the first computer processor further configured to receive instructions indicating that a third embedded application has been loaded into the first storage location, terminate execution of the second plurality of processing threads in response to receiving the one or more notifications, and execute the third embedded application while continuing to accept instructions from the host system and without restarting.

4. The apparatus of claim 1, wherein the first storage location and the second storage location comprise a single shared storage device.

5. The apparatus of claim 4, wherein the single shared storage device comprises a volatile random access memory (RAM) device.

6. The apparatus of claim 1, wherein the second embedded application is received by a second computer processor operatively coupled to a third storage location, the second computer processor configured to store the second embedded application in the third storage location.

7. The apparatus of claim 6 wherein the second computer processor is further configured to provide verification services, the verification services comprising one or more of:
   verifying that the second embedded application is authorized to be executed by the first computer processor; and
   verifying that the second embedded application is compatible with the first computer processor.

8. The apparatus of claim 6 wherein the second embedded application is copied from the third storage location to one of the first storage location and the second storage.

9. The apparatus of claim 6, wherein the third storage location comprises a non-volatile storage device.

10. The apparatus of claim 1, wherein the second embedded application fails to load into the one of the first storage location and the second storage location, and the first computer processor continues to execute the first embedded application and the first plurality of processing threads in response to a failure in loading the second embedded application.

11. A method for concurrent embedded application updates comprising:
   executing a first embedded application, via a first computer processor, the executing generating a first plurality of processing threads, the first computer processor coupled to a first storage location and a second storage location;
   accepting and processing instructions from a host system at the first computer processor;
   receiving one or more notifications indicating that a second embedded application has been successfully loaded into one of the first storage location and the second storage location;
   terminating execution of the first plurality of processing threads in response to receiving the one or more notifications; and
   executing the second embedded application while continuing to accept instructions from the host system and without restarting in response to receiving the one or more notifications.

12. The method of claim 11, wherein the first embedded application is stored in the first storage location, and the second embedded application is stored in the second storage location.

13. The method of claim 12, wherein executing the second embedded application generates a second plurality of processing threads;
   receiving instructions, at the first computer processor, indicating that a third embedded application has been loaded into the first storage location;
   terminating execution of the second plurality of processing threads in response to receiving the one or more notifications; and
   executing the third embedded application while continuing to accept instructions from the host system and without restarting.

14. The method of claim 11, wherein the first storage location and the second storage location comprise a single shared storage device.

15. The method of claim 14, wherein the single shared storage device comprises a volatile random access memory (RAM) device.

16. The method of claim 11, wherein the second embedded application is received by a second computer processor operatively coupled to a third storage location, the second computer processor configured to store the second embedded application in the third storage location.

17. The method of claim 16 wherein the second computer processor is further configured to provide verification services, the verification services comprising one or more of:
   verifying that the second embedded application is authorized to be executed by the first computer processor; and
   verifying that the second embedded application is compatible with the first computer processor.

18. The method of claim 16 wherein the second embedded application is copied from the third storage location to one of the first storage location and the second storage.

19. The method of claim 16, wherein the third storage location comprises a non-volatile storage device.

20. The method of claim 11, wherein the second embedded application fails to load into the one of the first storage location and the second storage location, and the first computer processor continues to execute the first embedded application and the first plurality of processing threads in response to a failure in loading the second embedded application.

21. An apparatus for implementing concurrent embedded application updates comprising:
   a hardware device configured to receive requests from a host system, the hardware device comprising a first computer processor operatively coupled to a first storage device, a second storage device;
   the first computer processor for executing a first embedded application, the executing generating a first plurality of processing threads;
   the first computer processor configured to accept and process instructions from the host system, receive one or more notifications indicating that a second embedded application has been successfully loaded into one of the first storage device and the second storage device, terminate execution of the first plurality of processing threads in response to receiving the one or more notifications, and execute the second embedded application while continuing to accept instructions from the host system and without restarting in response to receiving the one or more notifications.

22. The apparatus of claim 21, wherein the hardware device further comprises a second computer processor operatively coupled to a third storage device, the second embedded application is received by the second computer processor, the second computer processor configured to store the second embedded application in the third storage device.

23. The apparatus of claim 22 wherein the second computer processor is further configured to provide verification services, the verification services comprising one or more of:
   verifying that the second embedded application is authorized to be executed by the first computer processor; and
   verifying that the second embedded application is compatible with the first computer processor.

24. The apparatus of claim 22 wherein the second embedded application is copied from the third storage device to one of the first storage device and the second storage device.

25. The apparatus of claim 21, wherein the second embedded application fails to load into the one of the first storage device and the second storage device, and the first computer processor continues to execute the first embedded application and the first plurality of processing threads in response to a failure in loading the second embedded application.

* * * * *